R. H. WILLIAMS.
ELECTRIC MOTOR.
APPLICATION FILED AUG. 23, 1918.

1,432,584.

Patented Oct. 17, 1922.
2 SHEETS—SHEET 1.

Inventor
R. H. Williams.
By
Attorney

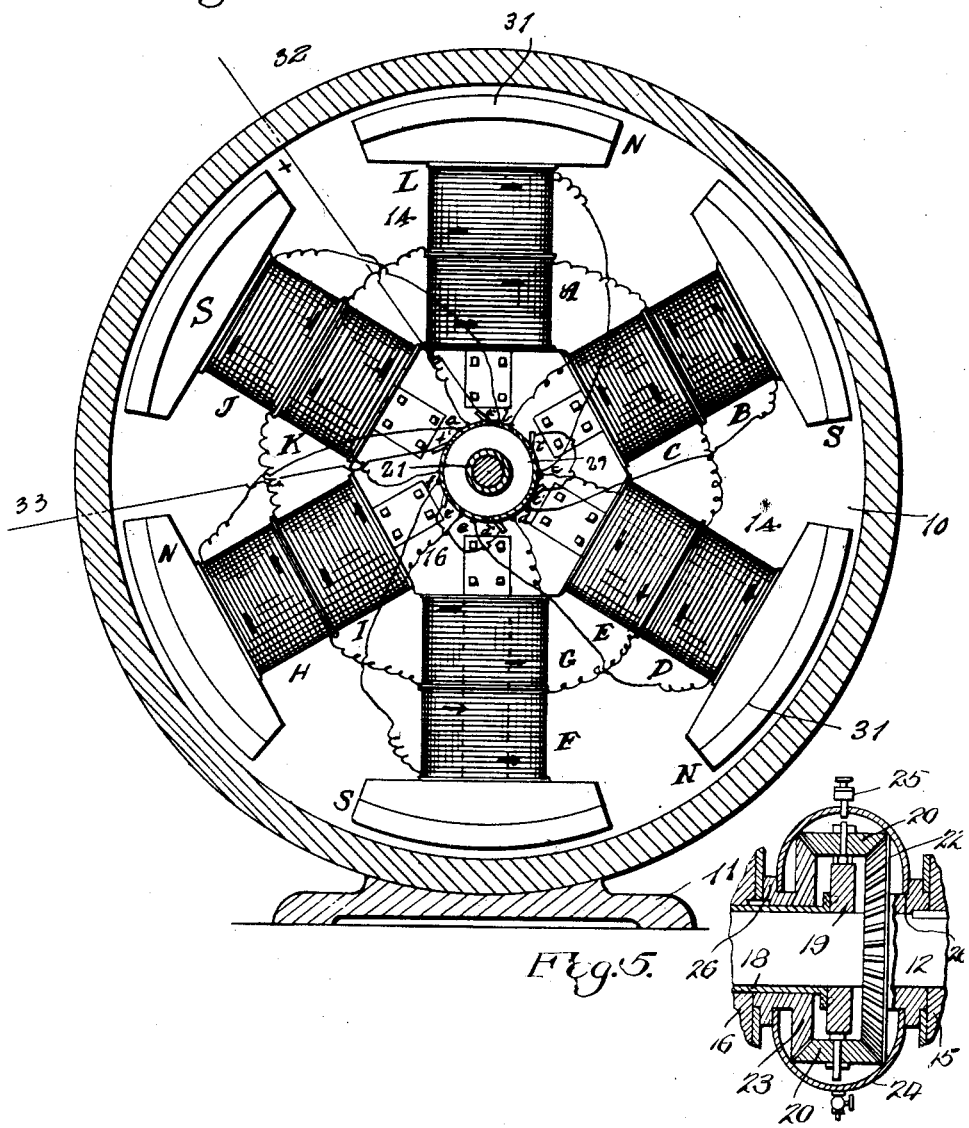

Patented Oct. 17, 1922.

1,432,584

UNITED STATES PATENT OFFICE.

RICHARD H. WILLIAMS, OF RICHMOND, INDIANA.

ELECTRIC MOTOR.

Application filed August 23, 1918. Serial No. 251,136.

*To all whom it may concern:*

Be it known that I, RICHARD H. WILLIAMS, a citizen of the United States, residing at Richmond, in the county of Wayne and State of Indiana, have invented certain new and useful Improvements in Electric Motors; and I do hereby declare the following to be a full, clear, and exact description of the invention, such as will enable others skilled in the art to which it appertains to make and use the same.

The object of the invention is to provide a relatively simple, inexpensive and efficient motor having the maximum driving power for the cubical space occupied, wherein the parts subject to deterioration, such as the magnets, windings and so forth, are standardized so as to be readily interchanged and replaced, wherein vibration in operation is minimized together with friction and the possibility of loss of current energy by grounding or short circuiting, and wherein especially the system of winding and connecting the elements is simplified so as to reduce the cost of manufacture and maintenance.

Further objects and advantages will appear in the course of the following description of the preferred embodiment, it being understood that changes in form, proportion and details may be resorted to within the scope of the appended claims without departing from the spirit of the invention.

In the drawings:

Figure 2 is a diagrammatic view of one of the armatures illustrating graphically the windings and connections.

Figure 4:
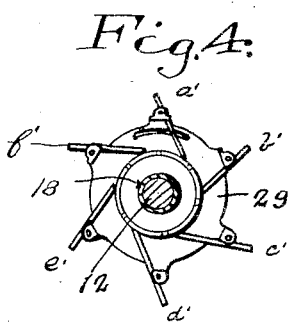
Figure 3:
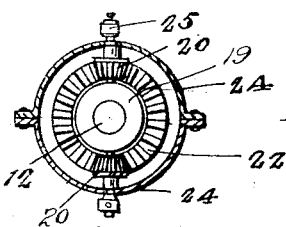
Figure 3 is a view of the transmission gearing.

Figure 4 of one of the commutators and related brushes.

Figure 1:
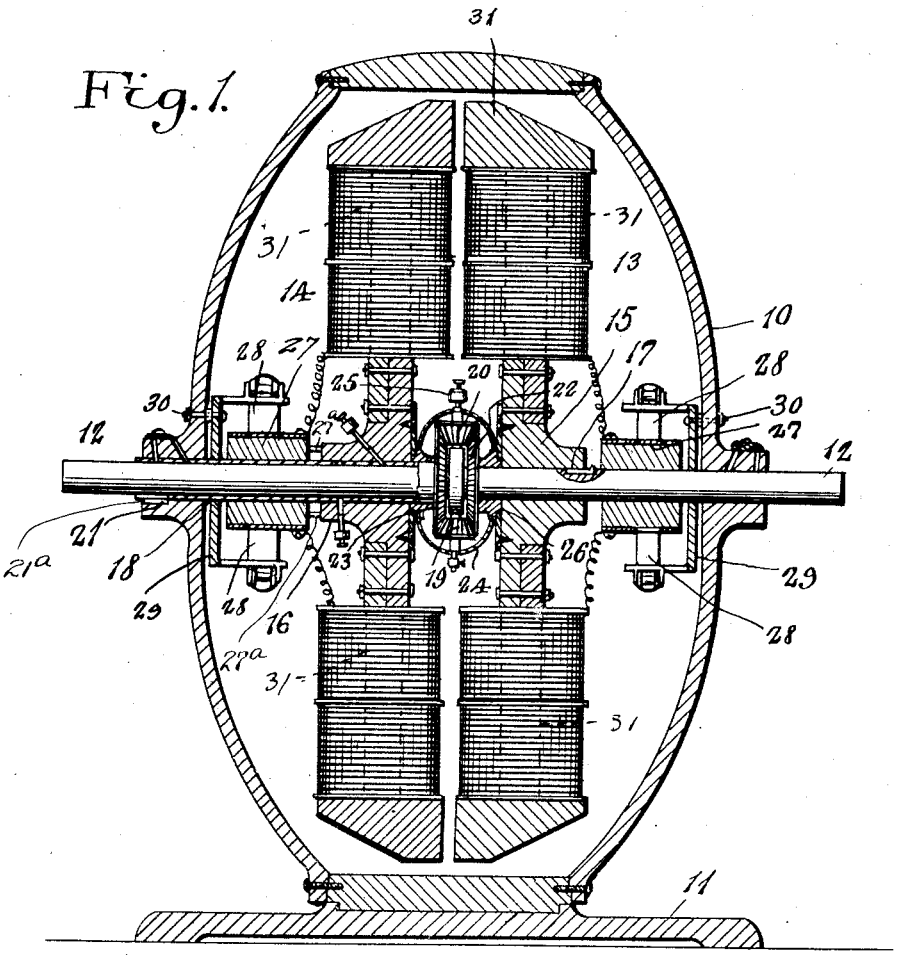
Figure 1 is a sectional view of the motor.

Figure 5 is a fragmentary detail sectional view on an enlarged scale of the central portion of the motor on the plane of Figure 1 to show the transmission mechanism and related features.

Within a suitable casing 10 having a base 11 is mounted a shaft 12 carrying the oppositely revoluble armatures 13 and 14, one of which serves by reason of the relation and windings as a field magnet for the other, the hubs 15 and 16 being respectively keyed to said shaft as shown at 17 and mounted upon a sleeve bearing 18 which carries a disk support 19 for the planetary gears 20. Said sleeve bearing is fixed in the seat 21 of the casing by a key 21ª and the master gears 22 and 23 which mesh with said planetary gears, are carried respectively by the hubs 15 and 16. Preferably the transmission gearing is arranged in a housing 24 to which may be connected any suitable lubricating device 25. Also preferably the housing is fitted at its inner edges in annular seats 26 in the hubs of the armatures, as shown in Figure 1.

A commutator 27, consisting as in the ordinary practice of a plurality of plates, corresponding with the number of magnets in the armature, is employed for each armature, and associated therewith, as in the ordinary practice, are the brushes 28 supported by brush holders 29 which may be secured in any suitable manner to the casing as indicated at 30. The commutator adjacent hub 16 is screwed thereto by elements 27ª.

In the form of motor illustrated, it being understood of course that substantially the same construction and arrangement of parts with coils and connections may be employed as a dynamo, each armature consists of six magnets having cores 31*, and each core is provided with inner and outer independent coils. In the drawings, for convenience, these several magnet coils are designated consecutively from A to L and they are connected in series, in circuit with the commutator elements which are designated respectively from $a$ to $f$. The corresponding brushes in the diagram are designated respectively from $a'$ to $f'$ inclusive, while the incoming and outgoing positive and negative or plus and minus wire connections 32 and 33 extend respectively to and from the terminal brushes $a'$ and $f'$.

The inner coil of one core and the outer coil of the next adjacent core are in series, the connections being made so that said coils produce fields of opposite polarity to their respective cores.

As will be seen by reference to the diagram, the current entering through the connection 32 and the brush $a'$ passes to the commutator element $a$ and is divided to traverse branch lead wires extending respectively to the winding A which is the inner coil of a positive or N magnet and the coil H which is the outer of another N or north magnet and from the coil A connection is made with the coil B of the next or negative or south magnet and thence with the commutator element $d$. From the coil H connection is made with the coil G which is the inner of another negative or south magnet and thence to the commutator element $d$. Thus the current entering through the brush $a'$ is divided, the branches passing to different pairs of coils represented respectively by the inner and outer coils of intermediate magnets and the outer and inner coils of other intermediate magnets and thence to the opposite commutator element $d$ (that is to say opposite to the incoming commutator element). From the element $d$ the current passes from the brush $d'$ to the brush $e'$ through the connecting bridging element and thence to the commutator element $e$, where again the current is branched and the current sent through these branches passes to other intermediate coils similar to those above described namely the coils I and J and the coils D and C and thence through both branches to the commutator element $b$ from which the united current passes from brush $b'$ to brush $c'$ through the bridging connection to the commutator element $c$ where again a branching of the current causes it to pass through other coils of other intermediate magnets represented at E and F and the coils L and K to the commutator element $f$ where the current being united is carried through the brush $f'$ to the connection 33 and thence to the other armature.

Obviously for an effective operation of the mechanism it is necessary that the polarity of the magnets should change periodically in the course of progress of each armature, the change occurring when the like or corresponding magnets of the two armatures are in registration so that there may be repulsion as between the registering magnets and attraction, respectively, as between them and the succeeding magnets, respectively, of the other armature. Moreover, as both armatures move, the same traveling in opposite directions, a change in polarity must occur in one of the armatures after each magnet has traversed one-half of the distance represented by the interval between adjacent magnets of the same armature.

From the foregoing description it will be understood that any of the magnets may be removed for rewinding and the latter may be accomplished with facility, there being no complication in this respect owing to the independence of the inner and outer coils, and it will also be seen that the connection between the several coils and elements of the structure are exposed and readily accessible so that any disarrangement thereof may be readily detected and repair made, and owing to the relatively greater diameter of the armature by reason of the omission of the field magnet for a motor of the same size or occupying the same cubical space as one of the ordinary construction, a greater effective power may be derived by reason of the increased leverage. It should also be noted that the number of magnets indicated in each armature is merely illustrative and may be modified as required in practice without modification of the principal of sequence in the windings and connections as set forth.

Having described the invention, I claim:

A motor having oppositely revoluble armatures arranged side by side, each armature consisting of a hub and a plurality of magnets, a shaft common to said armatures, a sleeve in which said shaft is journaled, one of said hubs being rigidly secured to the shaft and the other hub being revoluble to the sleeve commutators, one for each armature, one of said commutators being fixed on the shaft, the other commutator being revoluble on the sleeve bearing, and rigid with the last mentioned hub, a casing for the motor, holders mounted by said casing through which said shaft extends and enclosing said commutators to effect a compact arrangement, brushes for the commutators carried by the said holders, a gear wheel fixed on said shaft, a gear wheel revoluble on said sleeve and fixed to the last mentioned hub, a planetary gear journaled on said sleeve and in mesh with said gear wheels, plates on said hubs having openings therethrough, extensions on said gear wheels entering said openings and being in bearing contact with said plates, and a housing to enclose said gear wheels and gear, said extensions having seats to mount said housing.

In testimony whereof I affix my signature in presence of two witnesses.

RICHARD H. WILLIAMS.

Witnesses:
 FRANCES S. WILLIAMS,
 WILLIAM H. FISHER.